US011301070B2

(12) United States Patent
Kim (10) Patent No.: US 11,301,070 B2
(45) Date of Patent: *Apr. 12, 2022

(54) APPARATUS OF DISPLAY HAVING ADHESION REDUCTION LAYER FORMED MICRO PROTRUSION DESIGN

(71) Applicant: Young Su Kim, Suwon-si (KR)

(72) Inventor: Young Su Kim, Suwon-si (KR)

( * ) Notice: Subject to any disclaimer, the term of this patent is extended or adjusted under 35 U.S.C. 154(b) by 129 days.

This patent is subject to a terminal disclaimer.

(21) Appl. No.: 16/649,383

(22) PCT Filed: Aug. 29, 2018

(86) PCT No.: PCT/KR2018/009985
§ 371 (c)(1),
(2) Date: Mar. 20, 2020

(87) PCT Pub. No.: WO2019/059551
PCT Pub. Date: Mar. 28, 2019

(65) Prior Publication Data
US 2020/0301534 A1 Sep. 24, 2020

(30) Foreign Application Priority Data
Sep. 23, 2017 (KR) .................. 10-2017-0123042

(51) Int. Cl.
*B32B 3/00* (2006.01)
*G06F 3/041* (2006.01)
(Continued)

(52) U.S. Cl.
CPC .............. *G06F 3/0412* (2013.01); *B32B 3/06* (2013.01); *B32B 7/06* (2013.01); *C08G 18/3812* (2013.01); *C08G 18/588* (2013.01); *B32B 2405/00* (2013.01); *B32B 2457/208* (2013.01); *G06F 2203/04103* (2013.01)

(58) Field of Classification Search
CPC ......... B32B 3/06; B32B 7/06; B32B 2405/00; B32B 2457/208; G06F 3/0412
See application file for complete search history.

(56) References Cited

FOREIGN PATENT DOCUMENTS

| KR | 101350428 | 1/2014 |
|---|---|---|
| KR | 101512185 | 4/2015 |

(Continued)

OTHER PUBLICATIONS

International Search Report—PCT/KR2018/009985 dated Dec. 5, 2018.

*Primary Examiner* — Elizabeth E Mulvaney
(74) *Attorney, Agent, or Firm* — Cantor Colburn LLP (57) ABSTRACT

Provided is a display device including an adhesion reduction layer having a micro protrusion pattern capable of identification of the authenticity of at least one product from among a window, a touch screen and a display, which are freely detachable and are obtained via different channels, and a pattern engraved thereon. The display device includes a window, a display, and optionally a touch screen, and comprises an adhesion reduction layer having a micro protrusion pattern. The device comprises: a detachable layer which is positioned on at least one from among the window, the touch screen and the display and has an adhesive force of 0.1 gf/25 mm to 500 gf/25 mm; and a pattern made by a micro protrusion formed on part of the adhesion reduction layer which is positioned on any one from among the window, the touch screen and the display so as to face the detachable layer.

9 Claims, 7 Drawing Sheets

(51) Int. Cl.
*B32B 3/06* (2006.01)
*B32B 7/06* (2019.01)
*C08G 18/38* (2006.01)
*C08G 18/58* (2006.01)

(56) References Cited

FOREIGN PATENT DOCUMENTS

| | | |
|---|---|---|
| KR | 20150034829 | 4/2015 |
| KR | 101574923 | 12/2015 |
| KR | 20160120436 | 10/2016 |

APPARATUS OF DISPLAY HAVING ADHESION REDUCTION LAYER FORMED MICRO PROTRUSION DESIGN

CROSS-REFERENCE TO RELATED APPLICATIONS

This application is a national entry of PCT Application No. PCT/KR2018/009985 filed on Aug. 29, 2018, which claims priority to and the benefit of Korean Application No. 10-2017-0123042 filed Sep. 23, 2017, in the Korean Patent Office, the entire contents of which are incorporated herein by reference.

TECHNICAL FIELD

The present invention relates to a display device, and more specifically, to a display device applying a window or a touch screen that can be attached and detached using an adhesion reduction layer having a pattern configured of micro protrusions.

BACKGROUND ART

In a display device, a display such as a liquid crystal display (LCD), an organic light emitting diode (OLED), or an electrophoretic display (EPD) forms a screen. Such a display device is applied to various video screen devices. Meanwhile, the device employs a touch screen to provide convenience of handling. A window made of tempered glass or transparent polymer resin is disposed on the front surface of the touch screen. The window is divided into a screen unit at the center and a bezel unit on the rim, and protects the display device from damage caused by external impact or contact. The window is bonded and fixed to the touch screen using an optically clear adhesive (OCA), ultraviolet curable adhesive or the like. Recently, with the advent of flexible and curved displays, windows corresponding thereto are emerging.

Meanwhile, Korean Patent Registration No. 10-1574923 proposes a display device including a detachable window and an attaching and detaching method thereof. Specifically, the patent may easily replace a damaged window, easily separate the window from the display device, simplify the process of manufacturing the display device, reduce manufacturing cost, and design display device in various ways. Similarly, a display device capable of attaching and detaching a touch screen is also possible.

According to the patent, the display device may be manufactured by obtaining and assembling a window, a touch screen and a display through different channels, such as different manufacturers or products. For example, product A of company A, product B of company B, and product C of company C may be obtained as the window, the touch screen and the display through different purchase channels respectively and assembled as a display device including A, B and C. However, authenticity of the display device according to the patent may not be confirmed since it is difficult to confirm the different channels. In addition, although products of different channels may have their own patterns for identification of the products or for enhancement of aesthetics, the patterns may not be known before assembling the products.

DISCLOSURE OF INVENTION

Technical Problem

Therefore, the present invention has been made in view of the above problems, and it is an object of the present invention to provide a display device including an adhesion reduction layer having a micro protrusion pattern, which can confirm the authenticity and engraved pattern of at least one product among a window, a touch screen and a display that are freely attached and detached, and obtained through different channels.

Technical Solution

To accomplish the above object, according to one aspect of the present invention, there is provided a display device including a window and a display, optionally including a touch screen, and including an adhesion reduction layer having a micro protrusion pattern, the device comprising: a detachable layer located on any one among the window, the touch screen and the display, and having an adhesive force of 0.1 gf/25 mm to 500 gf/25 mm; and a pattern formed of micro protrusions on a portion of the adhesion reduction layer positioned to face the detachable layer to reduce adhesion force of the detachable layer, in any one among the window, the touch screen and the display.

In the device of the present invention, the detachable layer may be any one selected among an adhesive made by mixing a crosslinking agent with a thermosetting resin, i.e., an acrylic polymer, a silicon polymer or a urethane polymers, or an ultraviolet curable resin, a mixture of these, and a copolymer of these. The detachable layer penetrates into the micro protrusion pattern of the adhesion reduction layer to make the adhesion reduction layer transparent. The adhesion reduction layer may contain a fluorine-based resin or a silicon-based resin. The adhesion reduction layer may include a deposition layer made of titania ($TiO_2$) or silica ($SiO_2$), and a layer containing a fluorine-based resin or a silicon-based resin and located on the deposition layer. The detachable layer may have an adhesion force of 0.5 gf/25 mm to 500 gf/25 mm by the adhesion reduction layer.

In a preferred device of the present invention, the cross section of the micro protrusion pattern may have an angle, a curvature or a combination of these, and the micro protrusion pattern may be arranged in a line shape, a lattice shape, an island shape, or a combination of these. At this point, the micro protrusion pattern may be a character, a figure, or a combination of these.

Advantageous Effects

According to a display device including an adhesion reduction layer having a micro protrusion pattern of the present invention, as a pattern configured of micro protrusions is formed on the adhesion reduction layer, the authenticity and engraved pattern of at least one product among a window, a touch screen and a display that are freely attached and detached, and obtained through different channels can be confirmed.

DESCRIPTION OF SYMBOLS

| | |
|---|---|
| 100, 200, 300, 400, 500, 600: First to sixth display devices | |
| 10: Display | 14: Touch screen |
| 16: Adhesion reduction layer | 16a: Pattern |
| 18: Detachable layer | 20: Window |
| 22, 26, 30, 34, 36: First to fifth window structures | |

BEST MODE FOR CARRYING OUT THE INVENTION

Hereinafter, the preferred embodiments of the present invention will be described in detail, with reference to the accompanying drawings. The embodiments described below may be modified in various other forms, and the scope of the present invention is not limited to the embodiments described below in detail. The embodiments of the present invention are provided to more completely explain the present invention to those skilled in the art. In addition, in the drawings, the thicknesses of films (layers, patterns) and regions may be exaggerated for clarity. In addition, if a film (layer, pattern) is mentioned as being 'above', 'top', 'bottom', 'one side' of another film (layer, pattern), it is formed directly on the other film (layer, pattern), or other films (layers, patterns) may be interposed therebetween.

An embodiment of the present invention proposes a display device, which can confirm the authenticity and engraved pattern of at least one product among a window, a touch screen and a display that are freely attached and detached, and obtained through different channels, by forming a pattern configured of micro protrusions on the adhesion reduction layer. At this point, the window structure or the touch screen of the display device has a detachable layer formed to be attached to and detached from the touch screen or the display. Accordingly, a being-adhered device to be attached and detached may be regarded as being associated with the touch screen or the display. Here, attachment and detachment means freely attaching and detaching the detachable layer to and from the being-adhered device.

The detachable layer of the present invention may be attached and detached only to and from the touch screen and the display, and is clearly distinguished from a conventional window protection film attached to and detached from the window. That is, a device configured of a display without a window or a touch screen of the present invention is not a display device of a completed form. The display device is completed only when the window or the touch screen of the present invention is attached. By the way, a window protection film is attached on the window of the present invention, and the window protection film is attached to an already completed display. Accordingly, the window or the touch screen of the present invention is an essential component constituting the display device, whereas a conventional window protection film corresponds to an auxiliary component that can be selectively applied to a display device. Accordingly, the window protection film is excluded from the scope of the present invention.

The display device applied to the embodiment of the present invention refers to all image processing devices such as a mobile device, an information processing terminal, a television, and the like. The mobile device may be a cellular phone, a smartphone, a tablet or the like, and the information processing terminal may be an ATM, a kiosk or the like. The display of the display device may be a flat or curved one, or may be a flexible one. The image processing device includes a window, a touch screen and a display. Accordingly, the window generally refers to a window of a mobile devices, a windows of an information processing terminal, and windows of all image processing devices such as a television and the like. Similarly, the touch screen and the display also refer to touch screens and displays applied to all image processing devices.

Hereinafter, a detachable layer formed on a window structure including a window and a detachable layer formed on a window structure including a touch screen will be separately described.

The window structure is divided into first to fifth window structures attached to and detached from the touch screen and the display for convenience of explanation. That is, the first to fifth window structures are attached to and detached from the touch screen, the cover layer of the touch screen, and the display (hereinafter, referred to as a being-adhered device). Hereinafter, the first to fifth window structures will be separately described. Although the embodiment of the present invention shows an example of a display device to which the first to fifth window structures are applied, the window structures may be applied to display devices of other types within the scope of the present invention. The window structures of the present invention are separately manufactured and attached to and detached from the being-adhered device. At this point, the window structures may be manually attached.

Hereinafter, it will be described assuming that a detachable layer is on a window or a touch screen, and an adhesion reduction layer is on a corresponding touch screen or display. However, in some cases, an adhesion reduction layer is on a window or a touch screen, and a detachable layer may be on a corresponding touch screen or display. Here, the prior case will be described as an example.

<Display Device Applying First Window Structure Attached to and Detached from Touch Screen>

Figure 1:
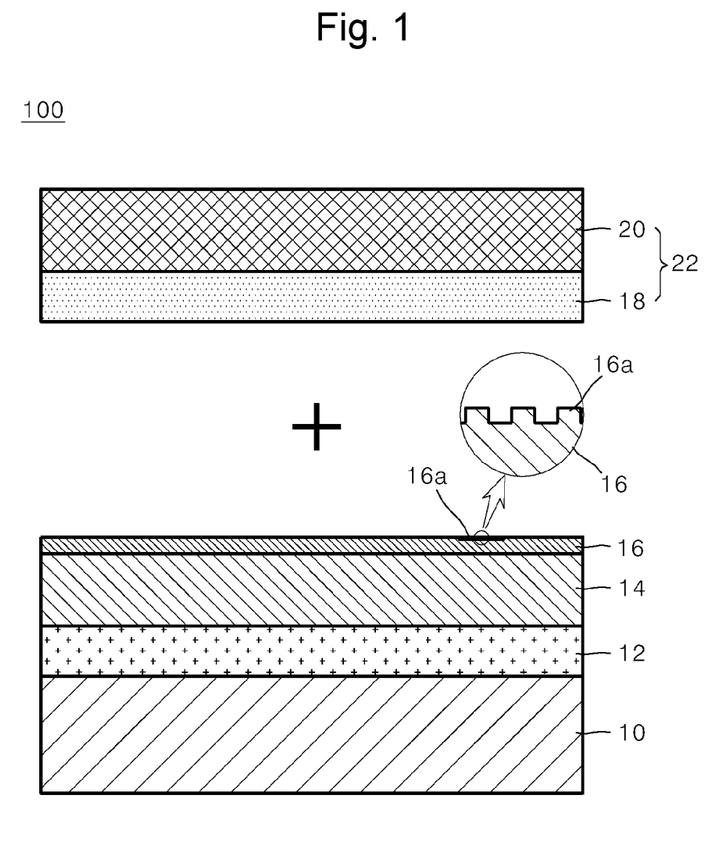
FIG. 1 is a cross-sectional view for describing a first display device including a detachable first window structure according to the present invention.
Figure 2:
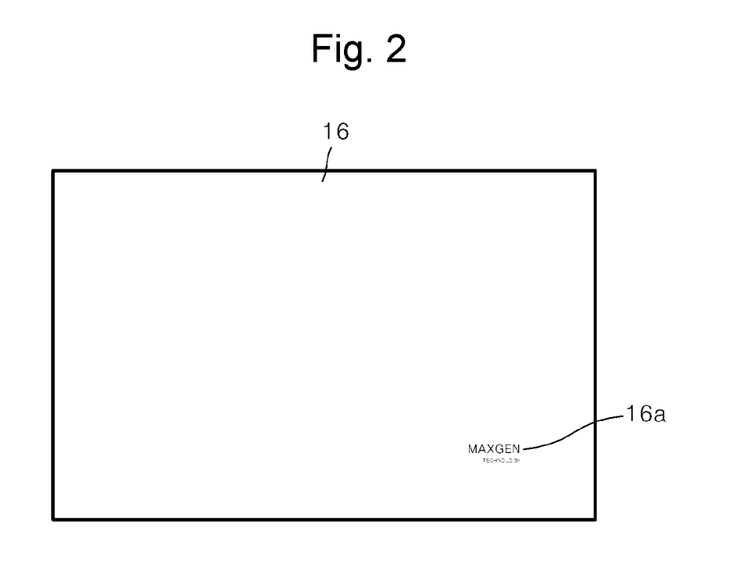
FIG. 2 is a plan view showing a pattern of micro protrusions existing on the adhesion reduction layer of FIG. 1.
Figure 3:
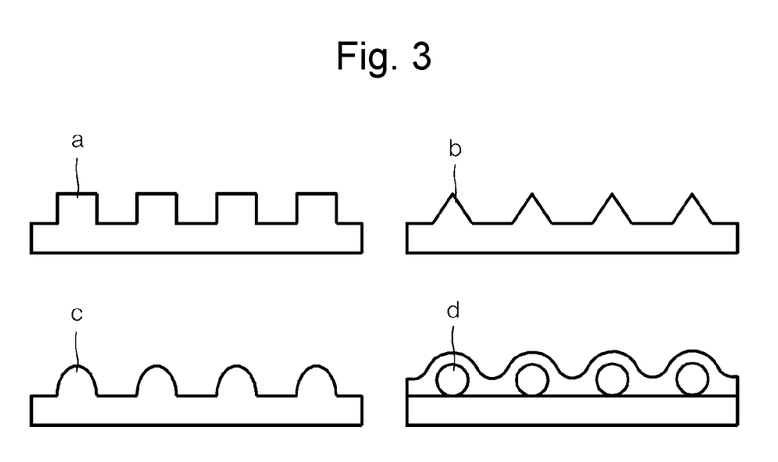
FIG. 3 is a cross-sectional view showing examples of the micro protrusions of the pattern of FIG. 1.

FIG. 1 is a cross-sectional view for describing a first display device 100 including a detachable first window structure according to an embodiment of the present invention. FIG. 2 is a plan view showing a pattern 16a of micro protrusions existing on the adhesion reduction layer 16 of FIG. 1. FIG. 3 is a cross-sectional view showing examples of the micro protrusions of the pattern of FIG. 1. However, it does not show a cross-sectional view of a strict meaning, and there may be components that may not appear in the drawings for convenience of explanation.

Referring to FIG. 1, the first display device 100 is configured by sequentially stacking a display 10, a bonding layer 12, a touch screen 14, an adhesion reduction layer 16, a detachable layer 18, and a window 20. At this point, the detachable layer 18 and the window 20 are referred to as a first window structure 22 together. The display 10 includes a liquid crystal display (LCD), an organic light emitting diode (OLED), an electrophoretic display (EPD) and the like, and quantum dots are also utilized. The bonding layer 12 firmly bonds the touch screen 14 to the display 10. For example, a thermosetting adhesive or an ultraviolet curable adhesive may be used. However, the bonding layer 12 is not limited thereto, and an OCA tape or the like may also be used. The touch screen 14 has a conductive pattern formed on one side or both sides of an insulating layer made of metal oxide or plastic. The metal oxide is mainly applied to the conductive pattern, and the metal oxide includes ITO, ATO, ZnO, Cu, conductive polymer, silver nanowire or the like.

The window 20 may use a transparent material without limit. For example, the window 20 may include a glass substrate or a plastic substrate. Specifically, the glass substrate may be tempered glass, and the plastic substrate may include any one or any one or more among polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC). The window 20 may also be a stacked structure in which the tempered glass and the plastic substrate are formed as multiple layers.

The window 20 may have a print layer transparent or implementing various functions. The print layer may apply any one or any one or more coatings among transparent, translucent and color coatings. The print layer may be formed by silk printing, inkjet printing using UV, inkjet printing using thermosetting, or transfer printing. A functional coating layer such as anti-fingerprint coating, antimicrobial coating, or anti-scratch coating may be formed on the window 20. The functional coating layer may be formed by wet coating of applying a coating liquid or dry coating such as deposition. In addition, the characteristics such as shielding, anti-reflection, blue light blocking, electromagnetic wave blocking, privacy and the like may be provided on the bottom of the glass substrate or the plastic substrate of the window 20. In addition, an opening for exposing a button, a camera, a speaker or the like may be formed in the window 20.

Meanwhile, an adhesion reduction layer 16 is located on the touch screen 14 to facilitate attachment and detachment of the first window structure 22. The adhesion reduction layer 16 increases the slip property by lowering frictional force. The first window structure 22 may be easily attached to and detached from the touch screen 14 by the adhesion reduction layer 16. The adhesion reduction layer 16 may use a coating material of fluorine-based resin or silicon-based resin. The adhesion reduction layer 16 may be formed by depositing titania ($TiO_2$) or silica ($SiO_2$) on the touch screen 14 and then coating a fluorine-based resin or a silicon-based resin on the deposited touch screen 14. At this point, the fluorine-based resin or the silicon-based resin may be formed in an easy cleaning coating (ECC) method. If the adhesion reduction layer 16 is applied, generation of bubbles can be suppressed more effectively when the window 20 is attached. In addition, the adhesion reduction layer 16 allows a consumer to easily attach and detach the first window structure 22 by himself or herself without a tool.

The detachable layer 18 has an adhesive force of about 0.1 gf/25 mm to 500 gf/25 mm. The detachable layer 18 may be made of various materials within the scope of the present invention, and may be, for example, any one selected among an adhesive made by mixing a crosslinking agent with a thermosetting resin, i.e., an acrylic polymer, a silicon polymer or a urethane polymers, or an ultraviolet curable resin, a mixture of these, and a copolymer of these. When the adhesive force of the detachable layer 18 is about 0.1 gf/25 mm to 500 gf/25 mm, the detachable layer 18 has a self-adhesive force. The self-adhesive force is a property of the detachable layer 18 adhering itself without bubbles by simply putting the detachable layer 18 on the touch screen 14.

On the other hand, when the adhesion reduction layer 16 is applied to the touch screen 14, the self-adhesive force is improved more than when there is no adhesion reduction layer 16. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment layer 18 of the same material and thickness is provided, it is easier to attach the first window structure 22 without bubbles. In addition, owing to the effect of the adhesion reduction layer 16, separation of the first window structure 22 occurs relatively easily.

On the other hand, the detachable layer 18 may be a detachable fluid layer in the form of a pocket containing a fluid, or a detachable pattern that is partially cured to form a pattern. The detachable fluid layer includes a bonding surface bonded to a transparent sheet in the form of a pocket, an adhesive surface attached to a display component, and a side surface located between the bonding surface and the adhesive surface to form a side wall, and the pocket provides a space in which a fluid is filled. The detachable pattern is a pattern including an adhesive layer having an adhesive force of about 0.1 gf/25 mm to 500 gf/25 mm and a cured layer formed by curing the adhesive layer.

According to FIG. 2, a pattern 16a formed of micro protrusions exists in the adhesion reduction layer 16. The pattern 16a expresses a logo, a name, a product specification or the like as a character or a figure, and particularly refers to information requested by a customer. The authenticity and engraved pattern of at least one among a window, a touch screen and a display obtained through different channels may be confirmed. Other part of the adhesion reduction layer 16 than the pattern 16a is in a state without having micro protrusions. The pattern 16a is in a translucent state when it is separated from the detachable layer 18, and when the detachable layer 18 is attached to the adhesion reduction layer 16, the pattern 16a disappears and the adhesion reduction layer 16 becomes transparent.

According to FIG. 3, the pattern 16a of the adhesion reduction layer 16 is formed of various micro protrusions. Here are some examples. Here, micro protrusions having a cross section formed in any one shape selected among a rectangle (a), a triangle (b) and a circle (c), or made of beads or beads and a binder (d) are presented as examples. That is, the cross section of the micro protrusions a, b, c and d may have an angle, a curvature or a combination of these. When the pattern 16a is formed on the adhesion reduction layer 16 using the micro protrusions, the pattern 16a is translucent, and transmittance of light is lowered. As the transmittance of the pattern 16a formed of micro protrusions having reduced transmittance is lowered, the adhesion reduction layer 16 is visually distinguished from the transparent adhesive reduction layer 16 without having micro protrusions.

On the other hand, when the detachable layer 18 is attached to the adhesion reduction layer 16 having micro protrusions formed thereon according to an embodiment of the present invention, the adhesive of the detachable layer 18 penetrates into the space between the micro protrusions, and the translucent screen becomes transparent. Accordingly, although the adhesion reduction layer 16 having micro protrusions formed thereon is used, the clarity of screen in the transparent state may be continuously maintained.

The micro protrusions are formed in various ways. For example, the micro protrusions may be formed by mixing translucent beads such as silica or the like with UV or thermosetting resin or the like, and coating and curing the pattern 16a. In addition, the micro protrusions may be formed by pressing a sheet or roll mold engraved with micro protrusions on the pattern 16a coated with UV or thermosetting resin, and curing the pattern 16a. The pattern 16a having micro protrusions may be manufactured by transferring a film or a sheet coated with UV or thermosetting resin. The pattern 16a may be formed by shaping using a mold having a shape corresponding to the micro protrusions. The pattern 16a may be formed by coating resin or the like after masking or forming micro protrusions through exposure or etching, and removing the mask. The pattern 16a may be formed by radiating laser beam on the surface of the adhesion reduction layer 16. The pattern 16a may be formed by printing on the surface of the adhesion reduction layer 16 using UV or thermosetting ink. The pattern 16a may be formed on the surface by applying a physical impact on the surface of the adhesion reduction layer 16.

The first window structure 22 of the present invention is separately manufactured and protected by a release film. The release film is removed to attach the first window structure 22 to the touch screen 14 or the adhesion reduction layer 16. When the release film is removed, the detachable layer 18 is exposed. When the first window structure 22 having the exposed detachable layer 18 is manually attached to the touch screen 14 or the adhesion reduction layer 16, a display mounted with the window 20 may be completed. In addition, when the window 20 is damaged or to be replaced, the first window structure 22 (←20) is manually separated, and a new first window structure 22 may be attached.

Figure 4:
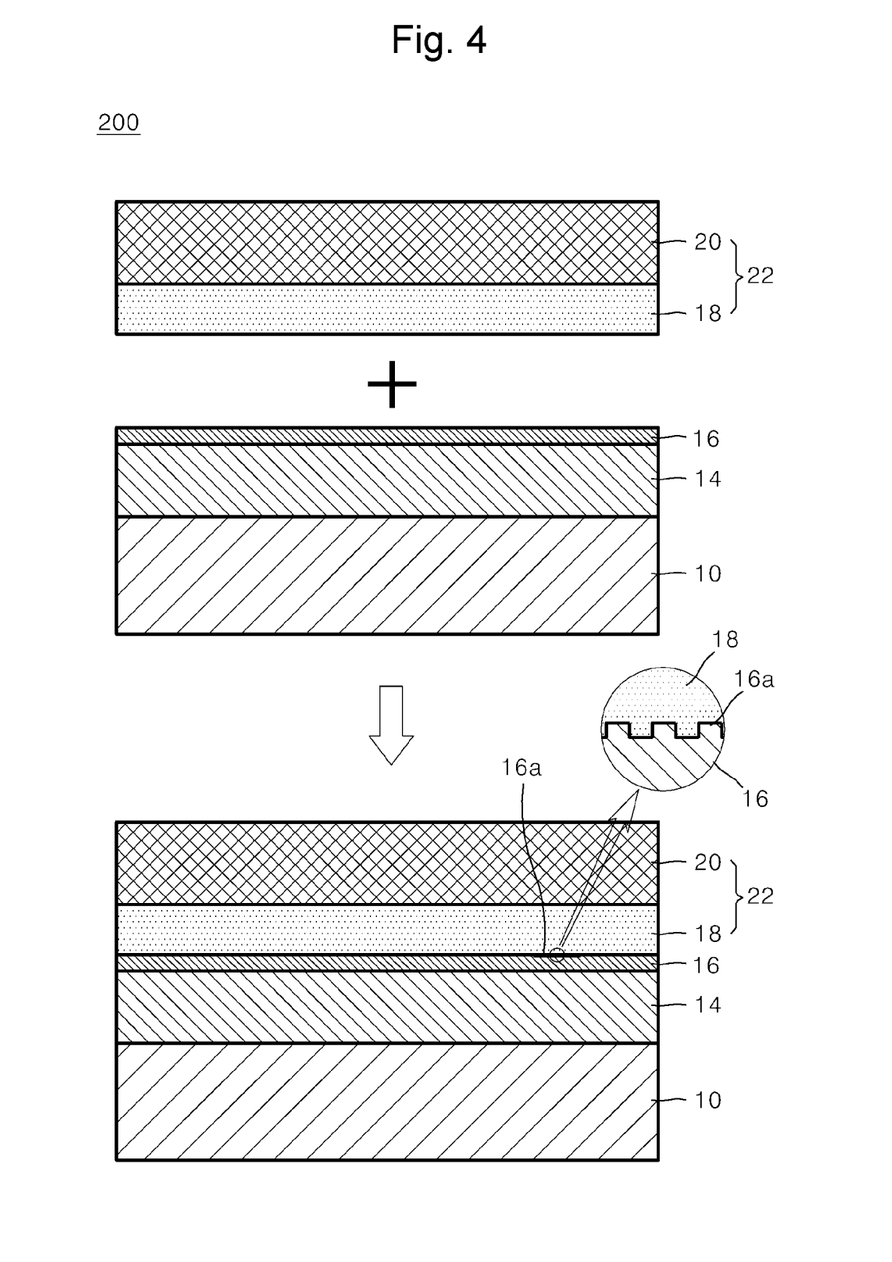
FIG. 4 is a cross-sectional view for describing a second display device including a detachable first window structure according to the present invention.

FIG. 4 is a cross-sectional view showing a second display device 200 including a first window structure 22 that can be attached and detached according to an embodiment of the present invention. However, it does not show a cross-sectional view of a strict meaning, and there may be components that may not appear in the cross-sectional view for convenience of explanation. At this point, the second display device 200 is the same as the first display device 100 except that the bonding layer 12 does not exist. Hereinafter, the matters overlapped with the above description will be omitted or briefly described.

Referring to FIG. 4, in the second display device 200, a display 10, a touch screen 14, an adhesion reduction layer 16 having a pattern 16a, and a first window structure 22 configure sequential layers. Here, the touch screen 14 is manufactured by forming a conductive pattern directly on the display 10. That is, the touch screen 14 is formed together with the conductive pattern formed on the display 10. At this point, the first window structure 22 includes the detachable layer 18 described above. The pattern 16a is in a translucent state when it is separated from the detachable layer 18, and when the detachable layer 18 is attached to the adhesion reduction layer 16, the pattern 16a disappears and the adhesion reduction layer 16 becomes transparent.

The second display device 200 may be provided with an adhesion reduction layer 16, like the first display device 100. The materials, functions and the like of the adhesion reduction layer 16 are the same as those described in the first display device 100. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment layer 18 of the same material and thickness is provided, it is easy to attach the first window structure 22 without bubbles.

Although not shown in the drawings, an additional component for providing various functions may be further provided between the window 20 and the detachable layer 18 of the first window structure 22 according to an embodiment of the present invention. The additional component may include an optically clear adhesive (OCA) layer, a shatterproof layer, and the like, and if necessary, a print layer and a functional coating layer may be appropriately formed. For example, after forming an OCA layer including a print layer on the window 20 and attaching a transparent synthetic resin film (e.g., a PET film), the detachable layer 18 may be formed on the transparent synthetic resin film. Since such an additional component is already well known, detailed description thereof will be omitted.

<Display Device Applying Second Window Structure Attached to and Detached from Touch Screen Cover Layer>

Figure 5:
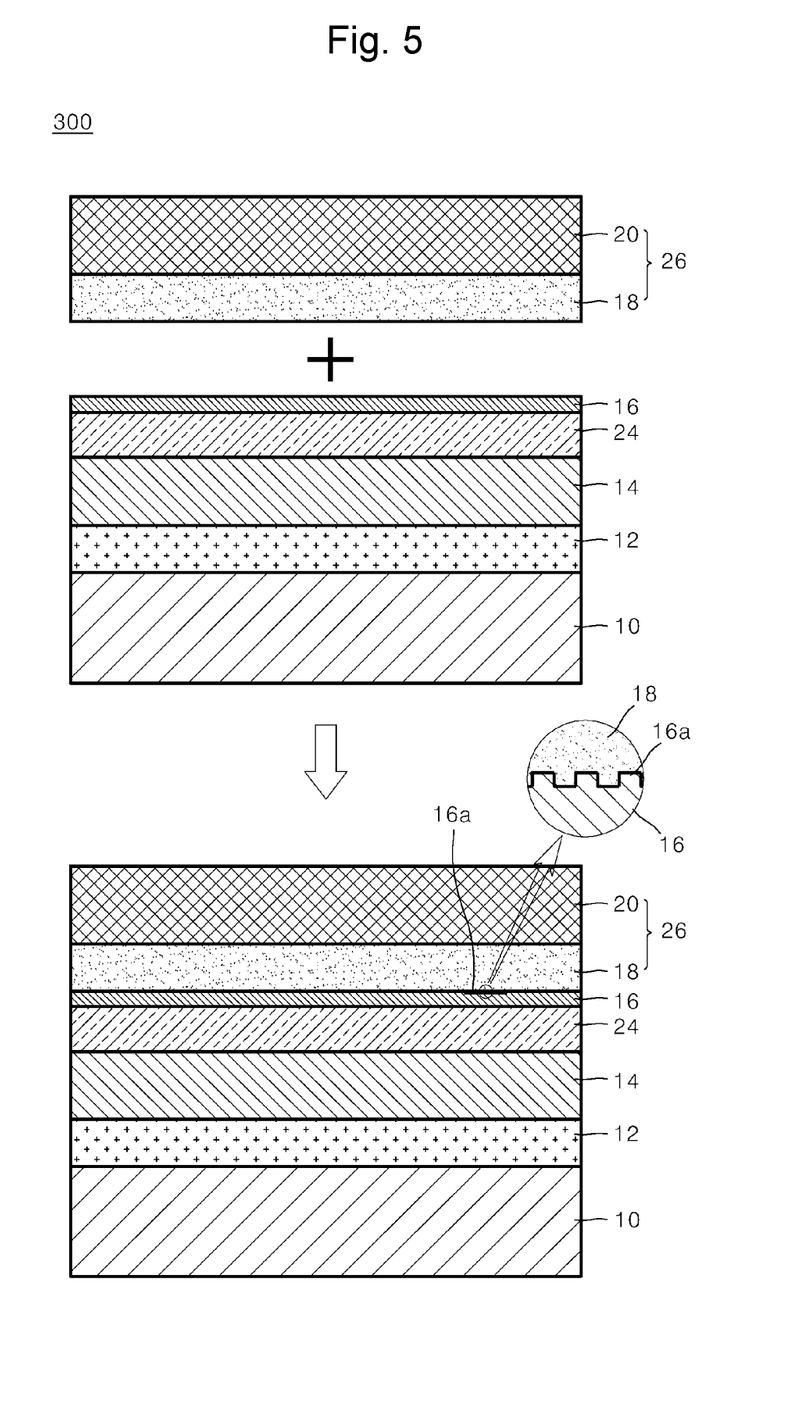
FIG. 5 is a cross-sectional view for describing a third display device including a detachable second window structure according to the present invention.

FIG. 5 is a cross-sectional view showing a third display device 300 including a second window structure 26 that can be attached and detached according to an embodiment of the present invention. However, it does not show a cross-sectional view of a strict meaning, and there may be components that may not appear in the cross-sectional view for convenience of explanation. At this point, the third display device 300 is the same as the first display device 100 except that a touch screen cover layer 24 is adopted. Accordingly, the detailed description of the same reference numerals will be omitted. At this point, the second window structure 26 may further include additional components, as is described in the first window structure 22.

Referring to FIG. 5, the third display device 300 may be implemented by sequentially stacking a display 10, a bonding layer 12, a touch screen 14, a cover layer 24, an adhesion reduction layer 16 having a pattern 16a, a detachable layer 18, and a window 20. In some cases, in the third display device 300, the display 10 may be directly bonded to the touch screen 14 without the bonding layer 12, like the second display device 200. Here, a conductive pattern for forming the touch screen 14 is disposed on the top or bottom of the cover layer 24. In a strict sense, the cover layer 24 may be regarded as a part of the touch screen 14. The cover layer 24 prevents the touch screen 14 from being damaged by impact or contamination. In addition, the third display device 300 configures the touch screen 14 by forming a conductive pattern directly on the display 10. In this case, the touch screen cover layer 24 may be positioned on the top of the display 10.

When the cover layer 24 is covered with the second window structure 26, it is positioned inside the third display device 300. Since the cover layer 24 (←22) is positioned inside, there is no worry that the cover layer 24 is exposed to the outside of the third display device 300 and damaged by impact or the like. The cover layer 24 may include a print layer or a functional coating layer, and may beautify the third display device 300 through various designs or translucence. In addition, the cover layer 24 may exclude the effect of windings and steps generated by various patterns, circuits or the like of the touch screen 14. When the effect of windings and steps disappears, attachment and detachment by the detachment layer 18 becomes easier.

The cover layer 24 may use a transparent material without limit. For example, the window 20 may include a glass substrate or a plastic substrate. Specifically, the glass substrate may be tempered glass or untempered glass, and in addition, the plastic substrate may include any one or more among polyethylene terephthalate (PET), polyethylene naphthalate (PEN), polyether sulfone (PES), polyimide (PI), polyarylate (PAR), polycarbonate (PC), polymethyl methacrylate (PMMA), and cycloolefin copolymer (COC). The plastic substrate is further preferable. The thickness of the cover layer 24 is sufficient if the touch screen (←20) is not damaged in the process of using the third display device 300.

The third display device 300 may be provided with an adhesion reduction layer 16, like the first display device 100. The materials, functions and the like of the adhesion reduction layer 16 are the same as those described in the first display device 100. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment layer 18 of the same material and thickness is provided, it is easy to attach the second window structure 26 without bubbles. In addition, owing to the effect of the adhesion reduction layer 16, separation of the second window structure 26 occurs relatively easily.

When the adhesive force of the detachable layer 18 is about 0.1 gf/25 mm to 500 gf/25 mm, the detachable layer 18 has self-adhesive force. The self-adhesive force is a property of the detachable layer 18 adhering itself without bubbles by simply putting the detachable layer 18 on the cover layer 24. On the other hand, when the adhesion reduction layer 16 is applied to the cover layer 24, the self-adhesive force is improved more than when there is no adhesion reduction layer 16. The pattern 16a is in a translucent state when it is separated from the detachable layer 18, and when the detachable layer 18 is attached to the adhesion reduction layer 16, the pattern 16a disappears and the adhesion reduction layer 16 becomes transparent.

When the window structure is damaged in the first to third display devices according to an embodiment of the present invention, the window structure may be replaced by selecting and attaching a new window structure. Specifically, the broken window structure is removed and replaced by attaching a new window structure. A customer himself or herself may manually perform the process of replacing the window structure, and the time required for replacing the window structure is very short. In addition, since only the window structure needs to be removed, recycle of the display device is easy. Furthermore, since the window structure is attached and detached, it can be easily attached without bubbles. Since a manufacturer only needs to manufacture only the parts other than the window structure and does not need to perform an adhering process, the manufacturing process is simplified.

<Display Device Applying Third Window Structure Attached to and Detached from Display>

Figure 6:
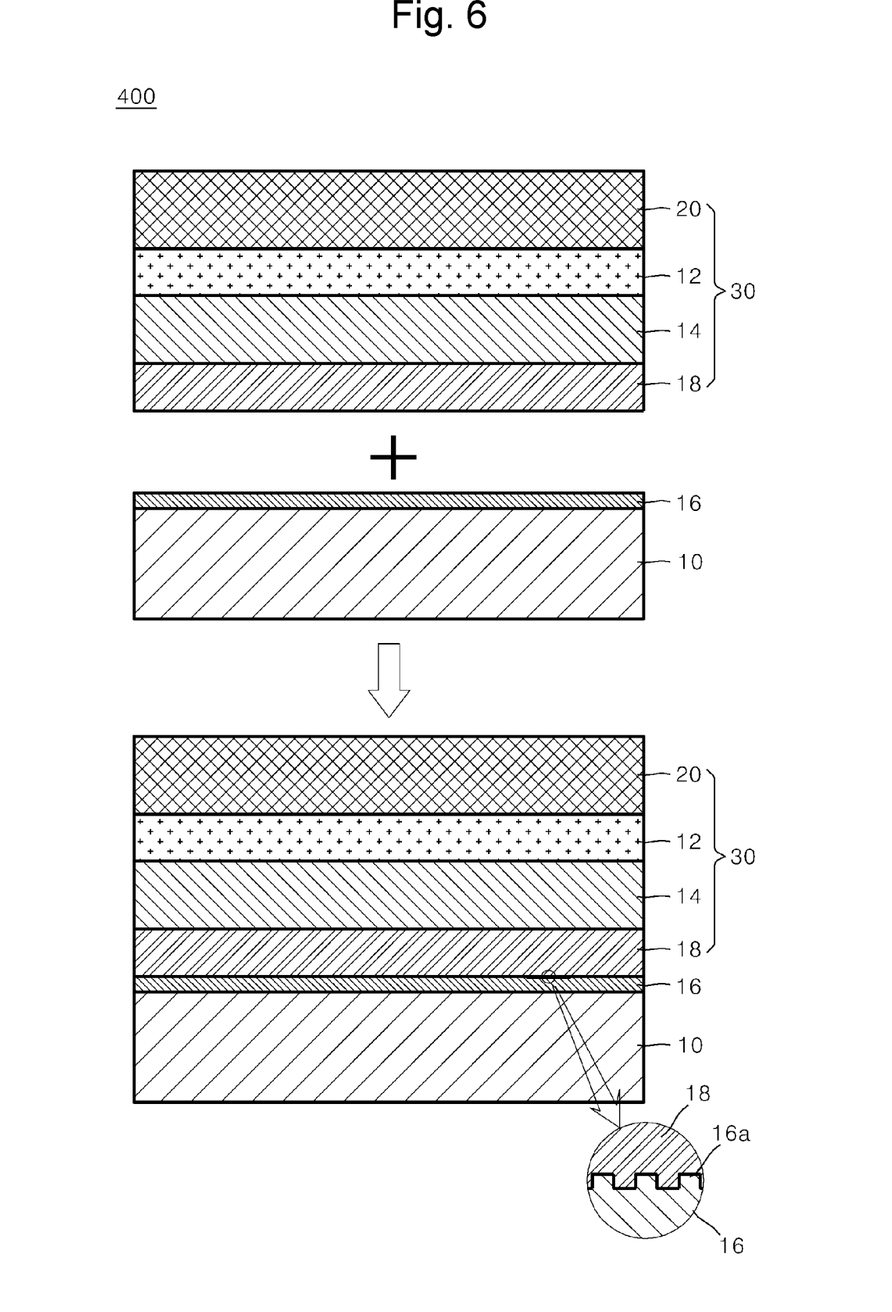
FIG. 6 is a cross-sectional view for describing a fourth display device including a detachable third window structure according to the present invention.

FIG. 6 is a cross-sectional view showing a fourth display 400 device including a third window structure 30 that can be attached and detached according to an embodiment of the present invention. However, it does not show a cross-sectional view of a strict meaning, and there may be components that may not appear in the cross-sectional view for convenience of explanation. At this point, the fourth display device 400 is basically the same as the first display device 100 except that the position of each layer is changed. Hereinafter, the matters overlapped with the above description will be omitted or briefly described.

According to FIG. 6, the fourth display apparatus 400 is configured by sequentially stacking a display 10, an adhesion reduction layer 16 having a pattern 16a, a detachable layer 18, a touch screen 14, a bonding layer 12, and a window 20. At this point, the window 20, the bonding layer 12, the touch screen 14, and the detachable layer 18 configure the third window structure 30. The display 10 includes a liquid crystal display (LCD), an organic light emitting diode (OLED), an electrophoretic display (EPD) and the like, and quantum dots are also utilized. For example, a thermosetting adhesive or an ultraviolet curable adhesive may be used for the bonding layer 12. However, the bonding layer 12 is not limited thereto, and an OCA tape or the like may also be used. The touch screen 14 has conductive patterns formed on one side or both sides of an insulating layer made of metal oxide or plastic. Metal oxide is mainly applied to the conductive pattern, and the metal oxide includes ITO, ATO, ZnO, Cu, conductive polymer, silver nanowire or the like.

Meanwhile, the adhesion reduction layer 16 is located on the display 10 to facilitate attachment and detachment of the third window structure 30. The adhesion reduction layer 16 increases the slip property by increasing the contact angle. The third window structure 30 may be easily attached to and detached from the touch screen 14 by the adhesion reduction layer 16. The adhesion reduction layer 16 may use a coating material of fluorine-based resin or silicon-based resin. The adhesion reduction layer 16 may be formed by depositing titania ($TiO_2$) or silica ($SiO_2$) on the display 10, and then coating a fluorine-based resin or a silicon-based resin on the deposited display 10. At this point, the fluorine-based resin or the silicon-based resin may be formed in an easy cleaning coating (ECC) method. If the adhesion reduction layer 16 is applied, generation of bubbles can be suppressed more effectively when the touch screen 14 is attached. In addition, the adhesion reduction layer 16 (←pattern 60) allows a consumer to easily attach and detach the third window structure 30 by himself or herself without a tool.

When the adhesive force of the detachable layer 18 is about 0.1 gf/25 mm to 500 gf/25 mm, the detachable layer 18 has self-adhesive force. The self-adhesive force is a property of the detachable layer 18 adhering itself without bubbles by simply putting the detachable layer 18 on the touch screen 14. On the other hand, when the adhesion reduction layer 16 is applied to the display 10, the self-adhesive force is improved more than when there is no adhesion reduction layer 16.

The adhesive force according to an embodiment of the present invention may vary depending on the presence of the adhesion reduction layer 16. The adhesive force is 0.5 gf/25 mm to 500 gf/25 mm when the adhesion reduction layer 16 exists. If the adhesion reduction layer 16 does not exist, the adhesive force is 0.1 gf/25 mm to 200 gf/25 mm. If there exists an adhesion reduction layer 16 when a detachment layer 18 of the same material and thickness is provided, it is easy to attach the third window structure 30 without bubbles. In addition, owing to the effect of the adhesion reduction layer 16, separation of the third window structure 30 occurs relatively easily.

The third window structure 30 of the present invention is separately manufactured and protected by a release film. The release film is removed to attach the third window structure 30 to the display 10. When the release film is removed, the detachable layer 18 is exposed. When the third window structure 30 having the exposed detachable layer 18 is manually attached to the display 10, a display mounted with the window 20 may be completed. Accordingly, unlike the prior art, a precise bonding process is not required. In addition, when third window structure 30 is damaged or to be replaced, the third window structure 30 is manually separated, and a new third window structure 30 may be attached. The pattern 16*a* is in a translucent state when it is separated from the detachable layer 18, and when the detachable layer 18 is attached to the adhesion reduction layer 16, the pattern 16*a* disappears, and the adhesion reduction layer 16 becomes transparent.

<Display Device Applying Fourth Window Structure Attached to and Detached from Display>

Figure 7:
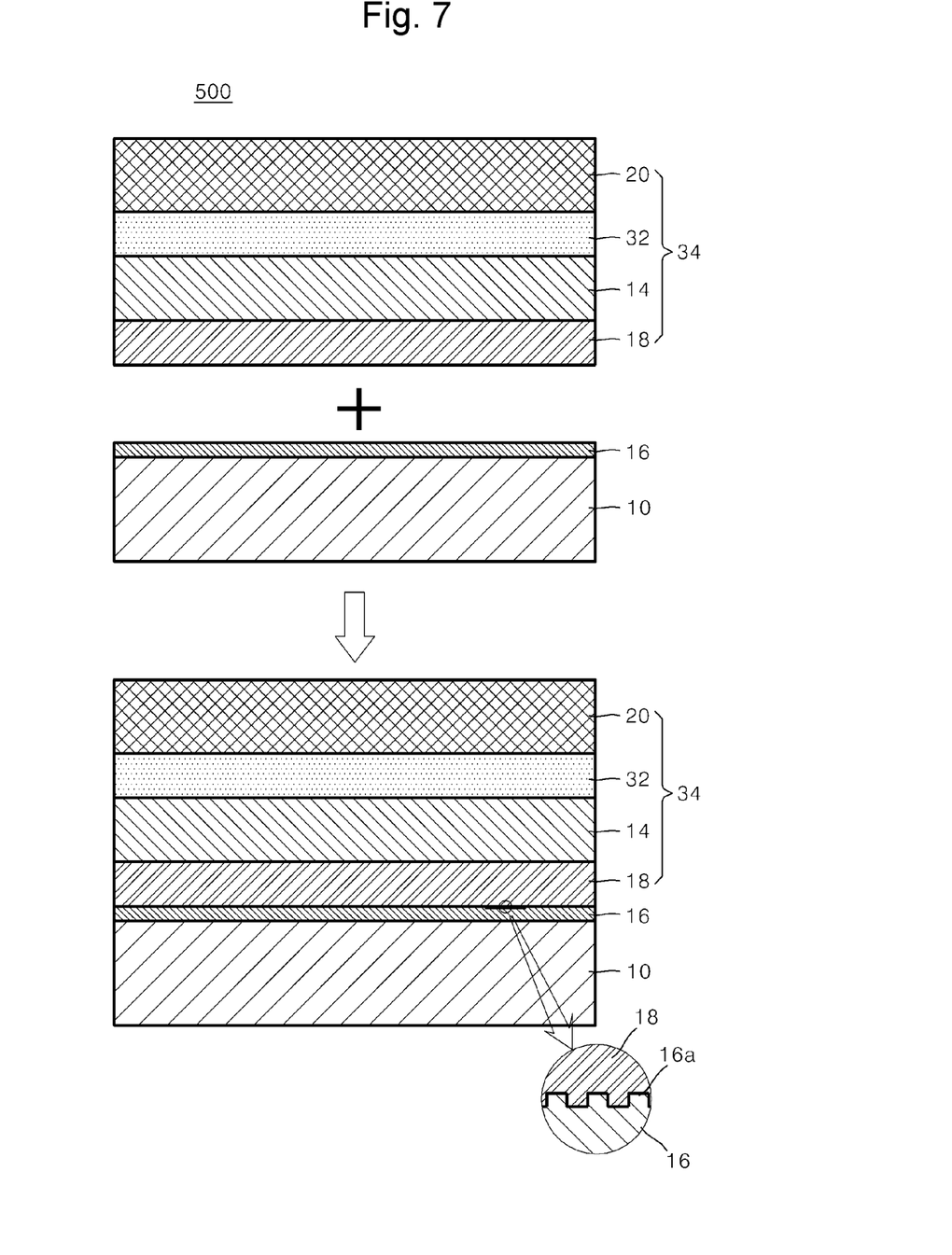
FIG. 7 is a cross-sectional view for describing a fifth display device including a detachable fourth window structure according to the present invention.

FIG. 7 is a cross-sectional view showing a fifth display device 500 including a fourth window structure 34 that can be attached and detached according to an embodiment of the present invention. However, it does not show a cross-sectional view of a strict meaning, and there may be components that may not appear in the cross-sectional view for convenience of explanation. At this point, the fifth display device 500 is the same as the first display device 100 except that the bonding layer 12 is replaced with a detachable layer 32. Hereinafter, the matters overlapped with the above description will be omitted or briefly described.

According to FIG. 7, a display 10, an adhesion reduction layer 16 having a pattern 16*a*, a detachable layer 18, a touch screen 14, a detachable layer 32, and a window 20 are sequentially stacked in the fifth display device 500. At this point, the window 20, the detachable layer 32, the touch screen 14, and the detachable layer 18 configure the fourth window structure 34. At this time, although the function and role of the detachable layer 32 are the same as those of the detachable layer 18, a different reference numeral is assigned since the position is different. The fourth window structure 34 is attached to and detached from the display 10 by the detachable layer 18.

The detachable layer 18 may be attached to the display 10 while the release film is removed. In addition, the fourth window structure 34 may be attached to and detached from the touch screen 14 by the detachable layer 32. In other words, the fifth (→fourth) window structure 34 includes the detachable layer 18 and the detachable layer 32 that can be attached to and detached from the display 10 and the touch screen 20 (→14), respectively. The pattern 16*a* is in a translucent state when it is separated from the detachable layer 18, and when the detachable layer 18 is attached to the adhesion reduction layer 16, the pattern 16*a* disappears, and the adhesion reduction layer 16 becomes transparent.

Although any transparent material may be used as the detachable layer 32, it may be an acrylic polymer, a silicon polymer, a urethane polymer, an adhesive made by mixing a crosslinking agent with an ultraviolet curable resin, a mixture thereof, or a copolymer thereof. The detachable layer 32 may be a single layer or a multilayer made of different materials in each layer, and at least one may be a single layer. In the multilayer, a material which forms each layer may be appropriately selected according to the environment in which the detachable layer 32 of the present invention is used. Thickness of the detachable layer 32 is acceptable if the adhesion is sufficient, and thickness of 10 to 200 micrometers is preferable. It is apparent that the thickness can be obtained through repeated experiments by those skilled in the art.

Although not shown in the drawings, an additional component for providing various functions may be further provided between the window 20 and the detachable layer 32 or between the touch screen 14 and the detachable layer 18 of the third and fourth window structures 30 and 34 (←32) according to an embodiment of the present invention. The additional component may include an optically clear adhesive (OCA) layer, a shatterproof layer, and the like, and if necessary, a print layer and a functional coating layer may be appropriately formed. For example, after forming an OCA layer including a print layer on the touch screen 14 and attaching a transparent synthetic resin film (e.g., a PET film), the detachable layer 18 may be formed on the transparent synthetic resin film. Since such an additional component is already well known, detailed description thereof will be omitted.

<Display Device Applying Fifth Window Structure Attached to and Detached from Display>

Figure 8:
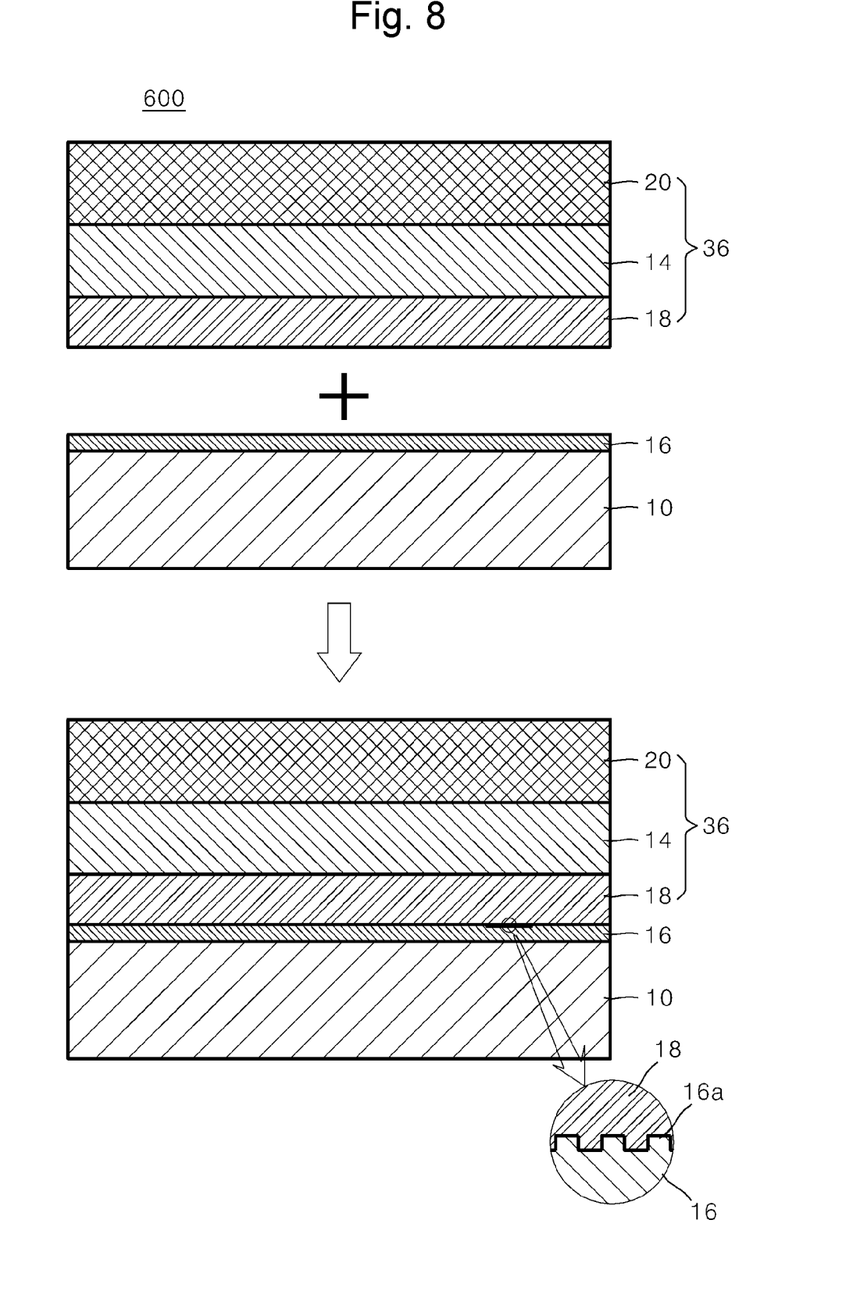
FIG. 8 is a cross-sectional view for describing a sixth display device including a detachable fifth window structure according to the present invention.

FIG. 7 is a cross-sectional view showing a sixth display device 600 including a fifth window structure 36 that can be attached and detached according to an embodiment of the present invention. However, it does not show a cross-sectional view of a strict meaning, and there may be components that may not appear in the cross-sectional view for convenience of explanation. At this point, the sixth display device 600 is the same as the fourth display device 400 except that the bonding layer 12 is not provided. Accordingly, the detailed description of the same reference numerals will be omitted. At this point, the fifth window structure 36 may further include additional components, as is described in the third window structure 30.

According to FIG. 8, the sixth display device 600 is configured by stacking a display 10, an adhesion reduction layer 16 having a pattern 16*a*, a detachable layer 18, a touch screen 14, and a window 20. At this point, the window 20, the touch screen 14, and the detachable layer 18 configure the fifth window structure 36. Here, the touch screen 14 is manufactured by forming a conductive pattern directly under the window 20. That is, the touch screen 14 is formed together with the conductive pattern formed under the window 20.

The sixth display device 600 may be provided with an adhesion reduction layer 16, like the fourth display device 400. The materials, functions and the like of the adhesion reduction layer 16 are the same as those described in the fourth display device 400. The adhesive force according to an embodiment of the present invention may vary depending on the presence of the adhesion reduction layer 16. The adhesive force is 0.5 gf/25 mm to 500 gf/25 mm when the adhesion reduction layer 16 exists, whereas the adhesive force is 0.1 gf/25 mm to 200 gf/25 mm when the adhesion reduction layer 16 does not exist. If there exists an adhesion reduction layer 16 when a detachment layer 18 of the same material and thickness is provided, it is easy to attach the fifth window structure 36 without bubbles. In addition, owing to the effect of the adhesion reduction layer 16, separation of the fifth window structure 36 occurs relatively easily.

When the adhesive force of the detachable layer 18 is about 0.1 gf/25 mm to 500 gf/25 mm, the detachable layer 18 has a self-adhesive force. The self-adhesive force is a property of the detachable layer 18 adhering itself without bubbles by simply putting the detachable layer 18 on the display 10. On the other hand, when the adhesion reduction layer 16 is applied to the display 10, the self-adhesive force is improved more than when there is no adhesion reduction layer 16. The pattern 16*a* is in a translucent state when it is separated from the detachable layer 18, and when the detachable layer 18 is attached to the adhesion reduction layer 16, the pattern 16a disappears, and the adhesion reduction layer 16 becomes transparent.

When the first to fifth window structures 22, 26, 30, 34 and 36 are applied, electrical connection units may be made to face each other in predetermined areas of the display 10 and the touch screen 14, respectively. For the connection units, part of the detachable layer 18 of the touch screen 14 (→the touch screen 14 and the detachable layer 18) may be removed. When the first to fifth window structures 22, 26, 30, 34 and 36 are attached to the touch screen 14 and the display 10, the connection units are connected to each other. In this manner, connections of the first to sixth display devices 100, 200, 300, 400, 500 and 600 may be implemented.

When the window structure is damaged in the display devices according to an embodiment of the present invention, the window structure may be replaced by selecting and attaching a new window structure. Specifically, the broken window structure is removed and replaced by attaching a new window structure. A customer himself or herself may perform the process of replacing the window structure, and the time required for replacing the window structure is very short. In addition, since only the window structure needs to be removed, recycle of the display device is easy. Furthermore, since the window structure is attached and detached by adhesion, it can be easily attached without bubbles. Since a manufacturer only needs to manufacture only the parts other than the window structure and does not need to perform an adhering process, the manufacturing process is simplified. Particularly, when an adhesion reduction layer (←pattern) exists, it is easier to attach the window structure without bubbles, and owing to the effect of the adhesion reduction layer (←pattern), separation of the window structure occurs relatively easily.

The appearance of the display device of the present invention can be diversely designed. The display device of the present invention may be designed to have a beautiful shape, various colors and patterns, and the like. This is since that when an original window structure is separated and a new structure is attached, the appearance of the window structure can be changed in a desired design. Conventionally, it needs to remove adhesion of the window structure and reattach a new window structure to change the design. However, in the display device of the present invention, the design is changed by detaching an existing window structure and attaching a new window structure. Accordingly, unlike a conventional window structure, the window structure of the present invention is not an essential component fixed to a display device and may be treated as a disposable component that can be attached and detached as needed. If the design is diversified in this way, the manufacturer of the display device does not need to provide a service corresponding to the design later.

According to a display device including an adhesion reduction layer having a pattern configured of micro protrusions of the present invention and a manufacturing method thereof, the adhesion reduction layer 16 is applied to facilitate attachment and detachment of a detachable layer having an adhesive force of 0.1 gf/25 mm to 500 gf/25 mm. As a pattern 16a configured of micro protrusions is formed on the adhesion reduction layer 16, the authenticity and engraved pattern of at least any one product among a window, a touch screen and a display that are freely attached and detached, and obtained through different channels can be confirmed. Owing to the simple manufacturing process, low manufacturing cost, and diverse designs, the display device of the present invention may satisfy desires of consumers. Furthermore, since anyone may easily replace a window, a touch screen and a window and touch screen by attaching and detaching, it can be treated as a disposable component rather than an essential component fixed to the display device.

While the present invention has been described above with reference to preferred embodiments, the present invention is not to be limited to the embodiments, and various modifications may be made by those skilled in the art within the scope of the present invention. For example, a separate means such as a groove or the like may be provided in the injection mold of the display device so that the window structure may be more easily attached and detached.

The invention claimed is:

1. A display device including a window and a display, optionally including a touch screen, and including an adhesion reduction layer having a micro protrusion pattern, the device comprising:
  a detachable layer located on any one among the window, the touch screen and the display, and having an adhesive force of 0.1 gf/25 mm to 500 gf/25 mm; and
  a pattern formed of micro protrusions on a portion of the adhesion reduction layer positioned to face the detachable layer to reduce adhesion force of the detachable layer, in any one among the window, the touch screen and the display.

2. The device according to claim 1, wherein the detachable layer is any one selected among an adhesive made by mixing a crosslinking agent with a thermosetting resin, i.e., an acrylic polymer, a silicon polymer or a urethane polymers, or an ultraviolet curable resin, a mixture of these, and a copolymer of these.

3. The device according to claim 1, wherein the detachable layer penetrates into the micro protrusion pattern of the adhesion reduction layer to make the adhesion reduction layer transparent.

4. The device according to claim 1, wherein the adhesion reduction layer contains a fluorine-based resin or a silicon-based resin.

5. The device according to claim 1, wherein the adhesion reduction layer includes a deposition layer made of titania ($TiO_2$) or silica ($SiO_2$), or a layer containing a fluorine-based resin or a silicon-based resin and located on the deposition layer.

6. The device according to claim 1, wherein the detachable layer has an adhesion force of 0.5 gf/25 mm to 500 gf/25 mm by the adhesion reduction layer.

7. The device according to claim 1, wherein a cross section of the micro protrusion pattern has an angle, a curvature or a combination of these.

8. The device according to claim 1, wherein the micro protrusion pattern is arranged in a line shape, a lattice shape, an island shape, or a combination of these.

9. The device according to claim 1, wherein the micro protrusion pattern is a character, a figure, or a combination of these.

* * * * *